US012200406B1

(12) United States Patent
Codner

(10) Patent No.: US 12,200,406 B1
(45) Date of Patent: Jan. 14, 2025

(54) AUTOMATED PROPERTY MONITORING AND SURVEILLANCE USING ARTIFICIAL INTELLIGENCE, MOBILE DEVICES, AND DRONES

(71) Applicant: Leon Codner, Riverview, FL (US)

(72) Inventor: Leon Codner, Riverview, FL (US)

( * ) Notice: Subject to any disclaimer, the term of this patent is extended or adjusted under 35 U.S.C. 154(b) by 0 days.

(21) Appl. No.: 18/763,167

(22) Filed: Jul. 3, 2024

(51) Int. Cl.
*H04N 7/18* (2006.01)
*G06Q 10/1093* (2023.01)
*G06Q 20/32* (2012.01)
*G06V 10/75* (2022.01)
*G06V 20/17* (2022.01)
*G06V 20/52* (2022.01)

(52) U.S. Cl.
CPC .............. *H04N 7/181* (2013.01); *G06V 10/75* (2022.01); *G06V 20/17* (2022.01); *G06V 20/52* (2022.01); *G06Q 10/1095* (2013.01); *G06Q 20/322* (2013.01)

(58) Field of Classification Search
None
See application file for complete search history.

(56) References Cited

U.S. PATENT DOCUMENTS

| | | | |
|---|---|---|---|
| 10,514,264 B2 | 12/2019 | Correnti et al. | |
| 10,949,930 B1 | 3/2021 | Tofte et al. | |
| 11,279,481 B2 | 3/2022 | Burks et al. | |
| 11,678,011 B1 * | 6/2023 | Fu | H04N 21/8549 348/143 |

* cited by examiner

*Primary Examiner* — Christopher Braniff
(74) *Attorney, Agent, or Firm* — Vladimir Postnikov

(57) ABSTRACT

The present disclosure provides a comprehensive system for remote property monitoring utilizing mobile devices, autonomous drones, and artificial intelligence (AI). The system includes a mobile application for user registration and monitoring requests, a central processing server for data analysis and management, and drones and mobile devices for capturing high-resolution images and videos. AI algorithms process the captured data to detect anomalies or unauthorized activities. The system generates real-time alerts and detailed reports, which are sent to property owners via the mobile application. The flexibility of the system allows it to be hosted in the cloud, on-premises, or in a hybrid model. The invention also supports integration with third-party home security systems, enhancing overall security. Key applications include property security, agricultural monitoring, infrastructure inspection, environmental conservation, disaster response, and urban planning. This automated, scalable, and efficient system provides robust, real-time property surveillance and management.

20 Claims, 7 Drawing Sheets

AUTOMATED PROPERTY MONITORING AND SURVEILLANCE USING ARTIFICIAL INTELLIGENCE, MOBILE DEVICES, AND DRONES

FIELD OF THE INVENTION

The present invention relates to the field of property monitoring and surveillance. Specifically, it involves a geo-location-based system and method utilizing mobile devices and autonomous drones for real-time property monitoring. The invention leverages artificial intelligence for anomaly detection and provides property owners with immediate updates and detailed reports on their property's status.

BACKGROUND OF THE INVENTION

Property monitoring and surveillance have long been essential practices for ensuring the security and integrity of real estate assets. Property owners, ranging from individual homeowners to large-scale property management firms, face significant challenges in safeguarding their properties from unauthorized access, squatting, vandalism, and other forms of misuse. Traditionally, these challenges have been addressed through various conventional methods, each with its own set of limitations and inefficiencies.

One of the most common traditional methods of property monitoring involves manual surveillance. Property owners or hired security personnel physically inspect properties at regular intervals. While this method can be effective to some extent, it is labor-intensive and time-consuming. The reliability of manual surveillance heavily depends on the diligence and availability of the personnel involved. Furthermore, manual checks often occur at intervals, creating significant gaps during which unauthorized activities can go unnoticed. In cases of large properties or multiple properties spread across different locations, manual surveillance becomes even more impractical and costly.

To mitigate the limitations of manual surveillance, property owners often turn to static security systems, such as closed-circuit television (CCTV) cameras, motion sensors, and alarm systems. CCTV cameras provide continuous monitoring and can record activities for later review. Motion sensors and alarms alert property owners or security services to potential breaches. However, these systems are not without their drawbacks. CCTV cameras, for instance, require constant monitoring, which can be both resource-intensive and subject to human error. Additionally, static cameras have limited coverage areas and may not capture all angles or locations of a property, leaving blind spots that can be exploited by intruders.

Motion sensors and alarm systems can help fill some of these gaps by detecting and alerting to movement within a property. However, these systems are prone to false alarms triggered by non-threatening activities, such as animals or environmental factors. Frequent false alarms can lead to complacency, reducing the overall effectiveness of the security measures. Moreover, traditional alarm systems typically do not provide visual confirmation of incidents, making it difficult for property owners to assess the situation accurately and determine the appropriate response.

Another conventional approach to property monitoring is hiring professional security services. These services offer trained personnel to patrol and monitor properties, providing a more robust security presence. While professional security services can enhance property safety, they come with significant costs. Hiring and maintaining a team of security personnel can be prohibitively expensive for many property owners, especially those with multiple properties or limited budgets. Additionally, even professional security teams are not immune to human limitations, such as fatigue or lapses in vigilance.

In recent years, advancements in technology have introduced new solutions to address the challenges of property monitoring. One such advancement is the use of drones for aerial surveillance. Drones offer several advantages over traditional methods, including the ability to cover large areas quickly and capture high-resolution images and videos from various angles. They can access hard-to-reach locations and provide real-time data to property owners. However, the use of drones for property monitoring also presents challenges. Drones require skilled operators, and their deployment can be subject to regulatory restrictions, such as no-fly zones or privacy laws. Additionally, the cost of acquiring and maintaining drone technology can be a barrier for some property owners.

Mobile devices have also emerged as a tool for property monitoring, leveraging the ubiquity of smartphones and tablets. Mobile applications can facilitate property checks by allowing users to capture and share photos and videos, receive alerts, and communicate with security personnel or property managers. While mobile technology enhances flexibility and convenience, it still relies on the availability and reliability of the individuals performing the checks. Furthermore, mobile-based monitoring lacks the automated capabilities needed to ensure continuous and comprehensive coverage.

The integration of artificial intelligence (AI) into property monitoring systems has shown promise in enhancing the effectiveness and efficiency of security measures. AI can analyze data from various sources, such as CCTV footage, drone imagery, and sensor inputs, to detect patterns and identify potential threats. AI-powered systems can reduce the incidence of false alarms by distinguishing between normal and suspicious activities. Additionally, AI can provide predictive insights, helping property owners anticipate and prevent security breaches. Despite these advantages, AI integration into property monitoring is still in its early stages, and many systems lack the sophistication needed to fully realize its potential. The implementation of AI also requires substantial investment in technology and expertise, which can be a barrier for some property owners.

Despite the advancements in property monitoring technology, several significant challenges remain unaddressed. One of the primary issues is the lack of real-time, comprehensive coverage. Many conventional systems rely on periodic checks or static monitoring, leaving gaps that can be exploited by intruders. The integration of various technologies, such as CCTV, drones, and mobile devices, often results in fragmented systems that do not communicate effectively with each other. This fragmentation can lead to delays in response times and incomplete data, hindering the ability of property owners to make informed decisions.

Another challenge is the accessibility and affordability of advanced property monitoring solutions. High costs associated with professional security services, drone technology, and AI integration can make these solutions unattainable for many property owners. Small property owners, in particular, may struggle to justify the investment in such systems, leaving their properties vulnerable to security breaches. Additionally, the complexity of setting up and maintaining advanced monitoring systems can be a deterrent for those without technical expertise.

Privacy concerns also pose a challenge to the adoption of property monitoring technologies. The use of CCTV cameras and drones raises questions about the potential for surveillance overreach and the protection of individuals' privacy rights. Regulatory frameworks governing the use of surveillance technology vary by region, and compliance with these regulations can be complex and burdensome for property owners. Balancing the need for effective property monitoring with the protection of privacy rights remains a delicate and ongoing issue.

Finally, there is the challenge of scalability and adaptability. Many existing property monitoring solutions are designed for specific use cases or property types, limiting their applicability to a broader range of scenarios. As the needs of property owners evolve, there is a demand for flexible systems that can adapt to different property sizes, types, and security requirements. Scalability is particularly important for property management companies overseeing multiple properties, as they require systems that can seamlessly expand and integrate with their existing infrastructure.

In summary, the field of property monitoring faces numerous challenges that conventional solutions have not fully addressed. Manual surveillance is labor-intensive and prone to human error, while static security systems and professional services are costly and limited in coverage. Technological advancements, such as drones and AI, offer potential improvements but come with their own set of challenges, including regulatory restrictions, high costs, and complexity. The need for real-time, comprehensive, and affordable property monitoring solutions remains unmet, highlighting the demand for innovative approaches that leverage the strengths of various technologies while addressing their limitations.

SUMMARY OF THE INVENTION

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

The present invention introduces a comprehensive system and method for remote property monitoring, leveraging the combined capabilities of mobile devices, autonomous drones, and artificial intelligence (AI) to provide real-time surveillance and anomaly detection. The system is designed to address the limitations of traditional property monitoring methods by offering a more dynamic, automated, and scalable solution.

The core of the invention is a mobile application that registers a network of users and receives monitoring requests from property owners. These requests, which include the geolocation of the property, are matched with nearby mobile users or autonomous drones based on geolocation data. Upon matching, a monitoring notification is transmitted to the selected mobile user or drone, which then captures time-stamped photographic and video evidence of the property.

Captured images and videos are processed using an AI-based processing system that detects anomalies or signs of unauthorized occupancy. If any anomalies are detected, the system generates an alert, including a summary of the findings, and sends this alert, along with the time-stamped photographic and video evidence, to the property owner via the mobile application. This ensures that property owners receive immediate updates on their property's status.

The mobile application further includes a user interface for scheduling the frequency and type of property monitoring, a payment processing unit for compensating mobile users or drone operators, and a rating system for evaluating their performance. Additional features include biometric verification of mobile users and drone operators, data processing to remove irrelevant information, and the ability to set specific zones within the property for focused monitoring.

The system also integrates with third-party home security systems, providing a comprehensive security solution. Continuous updates to the AI-based processing system improve anomaly detection accuracy over time. This invention offers a robust, real-time property monitoring solution that is both versatile and scalable, addressing modern property monitoring challenges effectively.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

BRIEF DESCRIPTION OF THE DRAWINGS

The accompanying drawings illustrate various aspects and embodiments of the present invention. These drawings are provided to enhance understanding and should not be construed as limiting the scope of the invention. Variations and modifications within the spirit and scope of the invention will be apparent to those skilled in the art.

DETAILED DESCRIPTION

Figure 1:
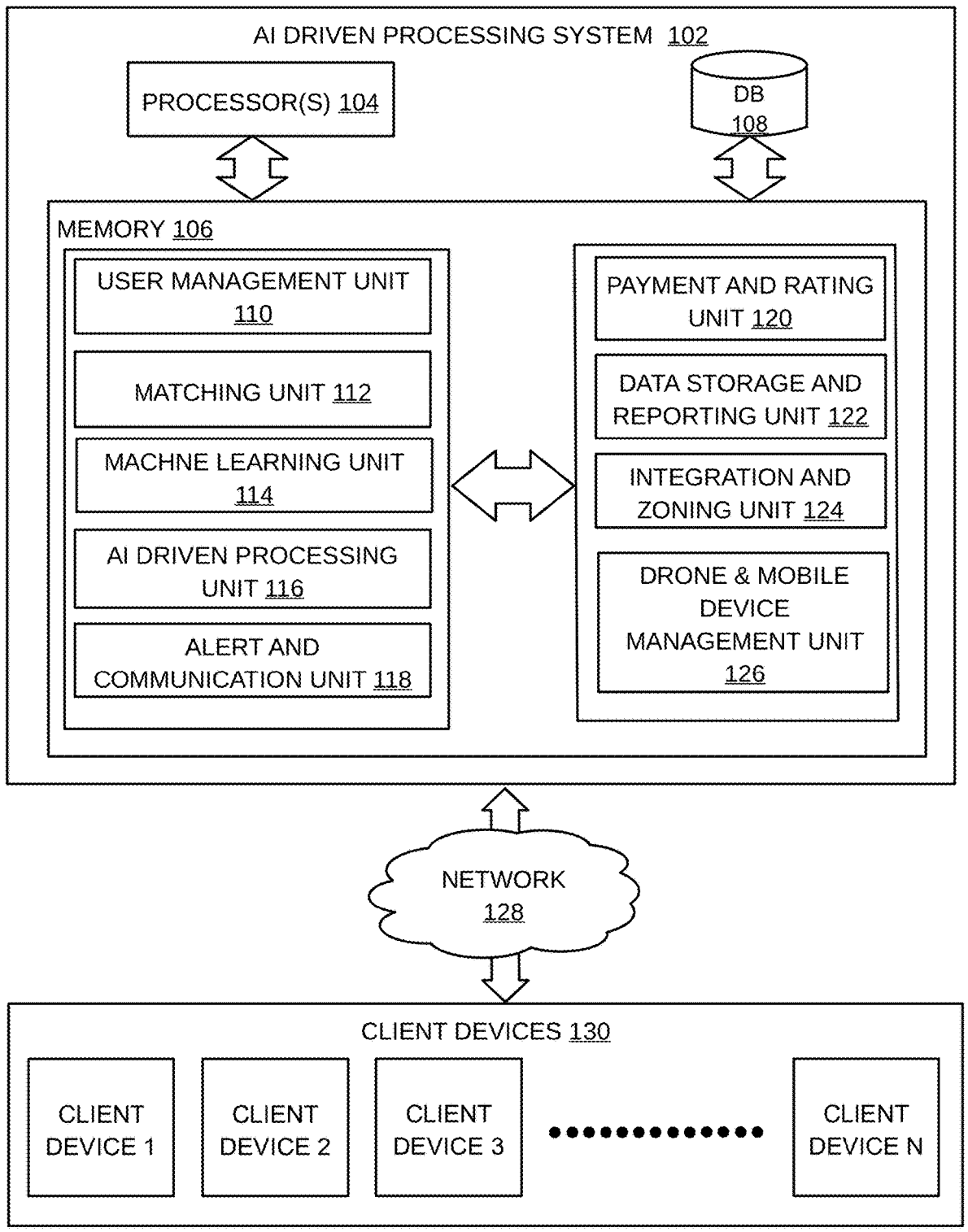
FIG. 1 is an exemplary illustration of an AI-driven processing system 100 with its various integrated units and client devices according to the embodiments of the present invention.

Property monitoring and surveillance have long been essential for maintaining the security and integrity of real estate assets. Property owners, ranging from individual homeowners to large-scale property management firms, face significant challenges in safeguarding their properties from unauthorized access, squatting, vandalism, and other forms of misuse. Traditional methods of property monitoring, such as manual surveillance, static security systems, and professional security services, have proven to be limited in effectiveness, costly, and often inefficient. Despite technological advancements, there remains a pressing need for a comprehensive, real-time, and automated solution that can address the evolving security needs of property owners.

The present invention provides a novel system and method for remote property monitoring, leveraging the combined capabilities of mobile devices, autonomous drones, and artificial intelligence (AI). This system is designed to overcome the limitations of traditional property monitoring methods by offering a dynamic, automated, and scalable solution that ensures real-time surveillance, anomaly detection, and immediate alerts to property owners.

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention.

The specification may refer to "an", "one" or "some" embodiment(s) in several locations. This does not necessarily imply that each such reference is to the same embodiment(s), or that the feature only applies to a single embodiment. Single feature of different embodiments may also be combined to provide other embodiments.

As used herein, the singular forms "a", "an" and "the" are intended to include the plural forms as well unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

The core of the invention is a mobile application that serves as the primary interface for property owners and service providers, including mobile users and drone operators. The application is designed to register a network of users and receive monitoring requests from property owners. These requests include the geolocation of the property and specific monitoring details. The mobile application features a user-friendly interface that allows property owners to schedule the frequency and type of property monitoring, view the status of their properties in real-time, and receive alerts if any anomalies are detected. Additionally, it enables mobile users and drone operators to accept monitoring requests and upload photographic and video evidence of the property. The monitoring request can include pre-set conditions for activation based on specific times or detected activities, ensuring flexible and customizable surveillance. The monitoring request can be accepted by any service provider with a mobile camera-enabled device having the mobile application installed. The system includes an option for property owners to schedule recurring monitoring sessions at specified intervals. The mobile application includes a feature for property owners to communicate directly with the mobile user or drone operator through a secure messaging system.

A crucial component of the mobile application is the payment processing unit, which handles all financial transactions between property owners and service providers. This unit ensures secure payment processing, compensating mobile users or drone operators based on the services rendered. After each monitoring session, property owners can rate the performance of the service providers and provide feedback through a built-in rating system. This feature helps maintain high service quality and allows property owners to select top-rated service providers for future monitoring needs.

The central processing server is the backbone of the system, facilitating seamless communication between the mobile application, mobile devices, and drones. When a monitoring request is received, the server processes it and matches it with an available service provider based on geolocation data. This matching process ensures that the property is monitored by the nearest available mobile user or autonomous drone, thereby optimizing the efficiency and timeliness of the monitoring service. The server also incorporates an AI-based processing system that plays a pivotal role in the invention's functionality.

The AI processing system analyzes the captured images and videos to detect any anomalies or signs of unauthorized occupancy. It uses advanced pattern recognition algorithms to compare the captured media against a comprehensive database of known patterns and authorized activities. If the AI system detects any irregularities, it generates an alert, including a summary of the findings, which is then sent to the property owner via the mobile application. All captured photographic and video evidence, along with the processing results, are securely stored in a central database. This data storage capability is essential for future reference and legal purposes, providing property owners with reliable documentation of all monitoring activities. The mobile application is configured to operate without reliance on property-based power sources, ensuring continued operation during power outages at the property. The mobile application allows property owners to view real-time live streaming from the mobile user or drone during the monitoring session. The system enables property owners to designate emergency contacts who will also receive alerts and notifications in case of detected anomalies.

The mobile application can operate in offline mode, allowing the mobile user or drone to continue capturing and storing data until connectivity is restored. The mobile application includes a training module for mobile users and drone operators to ensure they are proficient in using the system and capturing high-quality evidence. The mobile application includes a dashboard for property owners to manage multiple properties, view monitoring history, and analyze data trends. The mobile application integrates voice command functionality for hands-free operation by property owners. The AI-based processing system is capable of differentiating between human and non-human activities to reduce false alerts. The mobile application provides customizable alert settings, allowing property owners to define the sensitivity and types of alerts they wish to receive. The system provides property owners with a summary of legal and regulatory updates relevant to property monitoring and squatting laws through the mobile application. The system includes a community watch feature that allows property owners to collaborate and share information with neighbors and local authorities.

All captured photographic and video evidence, along with the processing results, are securely stored in a central database. This data storage capability is essential for future reference and legal purposes, providing property owners with reliable documentation of all monitoring activities. The system also includes a biometric verification unit that enhances the security and trustworthiness of the service providers. This unit captures biometric data from mobile users and drone operators, compares it with stored data, and authorizes users based on the verification results. This process ensures that only verified individuals can perform property monitoring tasks, thereby enhancing the overall security of the system.

Mobile devices, such as smartphones or tablets, play a critical role in the property monitoring process. These devices are used by service providers to capture time-stamped photographic and video evidence of the property. Equipped with high-resolution cameras and geolocation capabilities, mobile devices ensure accurate and detailed monitoring. The software on these mobile devices comprises several key units: the Camera Control Unit, which manages the capture of images and videos; the Geolocation Tracking Unit, which provides real-time location data; the Data Upload Unit, which transmits captured data to the central server; the User Interface Unit, which allows service providers to interact with the application; the Notification Receiver Unit, which handles incoming monitoring requests; the Biometric Verification Unit, which ensures that only authorized users can perform monitoring tasks; the Real-Time Monitoring Unit, which facilitates live streaming; and the AI Processing Unit, which can perform preliminary analysis of captured data.

Autonomous drones further enhance the system by providing aerial surveillance capabilities. These drones can cover large areas quickly and capture high-resolution images and videos from various angles, offering a broader perspective and accessing hard-to-reach locations of the property. The software on the drones includes several essential units: the Navigation Control Unit, which manages the drone's movements; the Image Capture Unit, which handles the capture of photographic and video evidence; the Data Transmission Unit, which sends captured data to the central server; the AI Processing Unit, which can perform preliminary analysis of captured data; the Geolocation Tracking Unit, which provides real-time location data; the Battery Management Unit, which ensures optimal power usage; the Collision Avoidance Unit, which prevents the drone from colliding with obstacles; and the Real-Time Monitoring Unit, which facilitates live streaming.

Captured images and videos are processed to remove any irrelevant data, focusing only on areas of interest identified by the property owner. This data processing step ensures that the property owner receives only the most relevant and actionable information. The system is designed to operate without reliance on property-based power sources, ensuring continued operation during power outages. This feature is particularly important for maintaining uninterrupted surveillance in remote or vulnerable locations.

The invention also includes the capability for property owners to set specific zones within the property for focused monitoring. This zoning feature allows property owners to prioritize certain areas for more frequent or detailed surveillance based on their specific security concerns. The system generates detailed reports that include AI analysis, time-stamped images, videos, and a log of all activities detected during the monitoring session. These comprehensive reports provide property owners with a thorough understanding of the security status of their properties.

To ensure continuous improvement, the AI-based processing system is regularly updated with new patterns and behaviors. This continuous learning capability enhances the accuracy of anomaly detection over time, adapting to evolving security threats and ensuring the system remains effective. The mobile application also integrates with third-party home security systems, providing a comprehensive security solution. This integration allows property owners to combine the benefits of the invention with existing security measures, creating a robust and multi-layered defense against unauthorized access and other security threats.

The alert and communication unit plays a crucial role in maintaining an effective feedback loop between the system and the property owner. When anomalies are detected, the alert and communication unit promptly generates alerts and sends them to the property owner, ensuring that they are immediately informed of any potential issues. These alerts are accompanied by summaries of the findings and the relevant photographic and video evidence, enabling property owners to quickly assess the situation and decide on appropriate actions.

The payment and rating unit ensures the financial sustainability and quality control of the system. This unit handles secure transactions between property owners and service providers, ensuring that mobile users and drone operators are compensated fairly for their services. The built-in rating system allows property owners to provide feedback on the performance of service providers, fostering a competitive environment that encourages high-quality service delivery.

The data storage and reporting unit is integral to the system's reliability and legal compliance. This unit securely stores all captured photographic and video evidence, along with the AI processing results, ensuring that property owners have access to reliable documentation of all monitoring activities. The reporting capabilities of this unit provide property owners with detailed and comprehensive reports that include AI analysis, time-stamped images, videos, and a log of all detected activities. These reports can be invaluable for legal purposes and for maintaining a detailed record of property security.

The integration and zoning unit enhances the system's versatility and adaptability. By allowing the system to integrate with third-party home security systems, this unit provides property owners with a comprehensive security solution that leverages existing security measures. Additionally, the zoning capabilities enable property owners to set specific areas within the property for focused monitoring, ensuring that critical areas receive the necessary attention.

Overall, the present invention offers a novel and comprehensive solution for remote property monitoring. By integrating mobile devices, autonomous drones, and AI, it provides real-time surveillance, anomaly detection, and immediate alerts, addressing the limitations of traditional property monitoring methods. The system is designed to be dynamic, automated, and scalable, ensuring it can meet the diverse and evolving needs of property owners. With its advanced features and robust architecture, this invention represents a significant advancement in property monitoring technology, enhancing security and peace of mind for property owners.

Referring to the figures, FIG. 1 illustrates the architecture of the AI-Driven Processing System 100, which operates as the central processing hub for the property monitoring system. This system includes several critical components and units that work together to ensure efficient property monitoring and management.

The AI-Driven Processing System 100 consists of the following main components: Processor(s) 104 are the central processing units responsible for executing the software instructions and managing the overall operations of the system. The processors handle data processing, control various units within the system, and ensure the smooth operation of the entire monitoring process. Memory 106 stores the software instructions and data necessary for the operation of the AI-Driven Processing System. It includes both volatile memory (RAM) for temporary data storage during processing and non-volatile memory (such as flash storage) for permanent data storage. Database 108 stores all the captured data, including photographic and video evidence, user information, and processing results. It is a critical component for maintaining historical records and enabling future reference and legal documentation.

User Management Unit 110 handles the registration and management of users within the system. It includes functions for user authentication, profile management, and access control, ensuring that only authorized users can access the system and perform monitoring tasks. Matching Unit 112 is responsible for matching monitoring requests with available service providers (mobile users or drones) based on geolocation data. It ensures that the nearest available service provider is assigned to a monitoring request, optimizing efficiency and response times.

Machine Learning Unit 114 continuously updates the AI models used in the system with new patterns and behaviors. It ensures that the AI-Driven Processing System remains effective and accurate in detecting anomalies and unauthorized activities over time. AI-Driven Processing Unit 116 performs the core AI analysis of the captured images and videos. It uses advanced pattern recognition algorithms to compare the captured media against a database of known patterns and authorized activities, detecting any anomalies or unauthorized occupancy.

Alert and Communication Unit 118 generates alerts and communicates them to the property owner when anomalies are detected by the AI-Driven Processing Unit. The alerts include summaries of the findings and the relevant photographic and video evidence, ensuring that property owners are promptly informed of potential issues. Payment and Rating Unit 120 handles secure financial transactions between property owners and service providers. It ensures that mobile users and drone operators are compensated for their services. Additionally, it includes a rating system that allows property owners to rate the performance of service providers, maintaining high service quality.

Data Storage and Reporting Unit 122 securely stores all captured photographic and video evidence, along with the AI processing results. It generates detailed reports that include AI analysis, time-stamped images, videos, and a log of all detected activities, providing property owners with comprehensive documentation of the monitoring sessions. Integration and Zoning Unit 124 allows the system to integrate with third-party home security systems, providing a comprehensive security solution. It also enables property owners to set specific zones within the property for focused monitoring, ensuring that critical areas receive the necessary attention.

Drone & Mobile Device Management Unit 126 manages the interactions between the central processing system and the mobile devices and drones used for surveillance. It handles the deployment, monitoring, and maintenance of these devices, ensuring they operate effectively and efficiently. Network 128 facilitates communication between the AI-Driven Processing System and various client devices. It ensures data is transmitted securely and efficiently across different components of the system.

Client Devices 130 include multiple mobile devices and drones used by service providers for property monitoring. Each client device (Client Device 1, Client Device 2, Client Device 3, etc.) is equipped with the necessary hardware and software to capture images and videos, process data, and communicate with the central processing system. The mobile devices are typically smartphones or tablets that service providers use to capture time-stamped photographic and video evidence of the property. These devices are equipped with high-resolution cameras and geolocation capabilities, ensuring accurate and detailed monitoring. Autonomous drones offer the advantage of aerial surveillance, providing a broader perspective and accessing hard-to-reach locations of the property. The drones are equipped with advanced imaging technologies and are capable of capturing high-resolution photos and videos from various angles.

The AI-Driven Processing System 100, depicted in FIG. 1, serves as the central hub for processing and managing property monitoring data. This system can be hosted in various locations to suit different operational requirements and infrastructure capabilities. One of the primary hosting options is a cloud environment. Hosting the AI-Driven Processing System in the cloud offers several advantages, including scalability, reliability, and remote accessibility. Cloud hosting allows the system to leverage powerful computational resources, ensuring efficient processing of large volumes of data and seamless integration with other cloud-based services.

Alternatively, the AI-Driven Processing System 100 can be hosted on on-premises servers. This option may be preferred by organizations that require greater control over their data and infrastructure. On-premises hosting provides the benefit of enhanced security and privacy, as all data processing and storage occur within the organization's physical premises. This setup can be particularly advantageous for organizations with strict regulatory compliance requirements or those that handle sensitive information.

Another potential hosting environment for the AI-Driven Processing System 100 is a hybrid model, which combines elements of both cloud and on-premises solutions. In a hybrid model, certain components of the system, such as data storage and AI processing, can be hosted in the cloud, while other elements, like user management and payment processing, can be maintained on-premises. This approach allows organizations to balance the benefits of cloud scalability and on-premises control, optimizing their operational efficiency and security.

In addition to these hosting options, the AI-Driven Processing System 100 can also be deployed in edge computing environments. Edge computing involves processing data closer to the source of data generation, such as on local servers or devices at the property site. This setup can reduce latency and improve response times by minimizing the need to transfer large amounts of data to centralized servers. Edge computing is particularly useful in scenarios where real-time processing and immediate decision-making are critical.

By offering multiple hosting options, the AI-Driven Processing System 100 provides flexibility to meet the diverse needs of property owners and organizations. Whether hosted in the cloud, on-premises, hybrid, or edge environments, the system ensures efficient and effective property monitoring and management.

Overall, FIG. 1 provides a detailed view of the AI-Driven Processing System 100 and its interconnected components, highlighting how each unit contributes to the comprehensive property monitoring and management solution offered by the invention.

Figure 2:
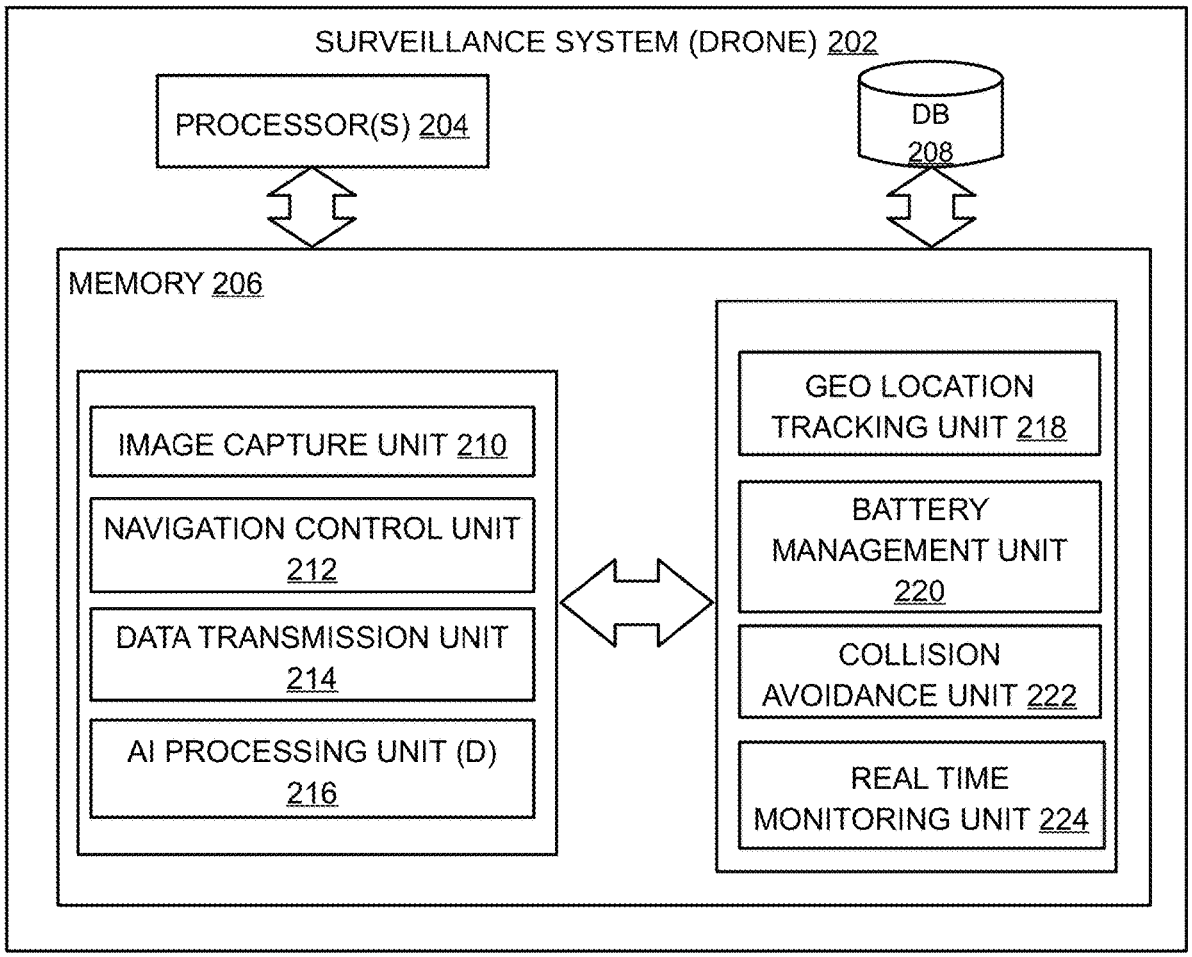
FIG. 2 is an exemplary depiction of a drone based surveillance system 200 including its key functional units according to the embodiments of the present invention.

FIG. 2 illustrates the architecture of the Surveillance System 200 utilized by drones for property monitoring. This system includes various components and units that enable the drone to effectively capture, process, and transmit data for real-time surveillance and anomaly detection.

The Surveillance System 200 consists of the following main components:

Processor(s) 204 are the central processing units responsible for executing the drone's software instructions and managing its overall operations. These processors handle data processing, control various units within the system, and ensure the drone operates efficiently during monitoring tasks. Memory 206 stores the software instructions and data necessary for the drone's operation. It includes both volatile memory (RAM) for temporary data storage during processing and non-volatile memory (such as flash storage) for permanent data storage.

Database 208 stores all captured data, including photographic and video evidence, navigation logs, and processing results. This component is essential for maintaining historical records and enabling future reference and legal documentation. The Image Capture Unit 210 manages the drone's cameras, ensuring the capture of high-resolution photographic and video evidence. This unit allows the drone to take time-stamped images and videos from various angles, providing comprehensive coverage of the property.

Navigation Control Unit 212 is responsible for managing the drone's flight path and movements. This unit ensures the drone navigates efficiently around the property, avoiding obstacles and covering all required areas. AI Processing Unit 216 performs preliminary AI analysis of the captured images and videos. It uses advanced pattern recognition algorithms to identify potential anomalies or unauthorized occupancy, providing real-time processing capabilities at the drone level.

Data Transmission Unit 214 handles the transmission of captured data from the drone to the central processing server. This unit ensures that photographic and video evidence, along with any preliminary AI analysis results, are securely and efficiently transmitted for further processing and storage. Geolocation Tracking Unit 218 provides real-time location data for the drone. This unit ensures that the drone's position is accurately tracked during monitoring tasks, allowing for precise navigation and data capture.

Battery Management Unit 220 monitors and manages the drone's power supply. This unit ensures optimal power usage and provides alerts when the battery is low, allowing for timely recharging or replacement to avoid interruptions during surveillance. Collision Avoidance Unit 222 prevents the drone from colliding with obstacles during its flight. This unit uses sensors and algorithms to detect and navigate around obstacles, ensuring safe and efficient operation.

Real-Time Monitoring Unit 224 facilitates live streaming of the drone's surveillance activities. This unit allows property owners and operators to view real-time footage captured by the drone, providing immediate insights into the property's status and any detected anomalies.

Overall, FIG. 2 provides a detailed view of the Surveillance System 200 utilized by drones, highlighting the critical components and units that enable effective property monitoring. Each unit within the system plays a vital role in ensuring the drone captures high-quality data, processes it efficiently, and transmits it securely for comprehensive and real-time property surveillance. This robust and integrated system ensures that drones can provide a broad and detailed perspective of the property, enhancing the overall effectiveness of the property monitoring solution.

Figure 3:
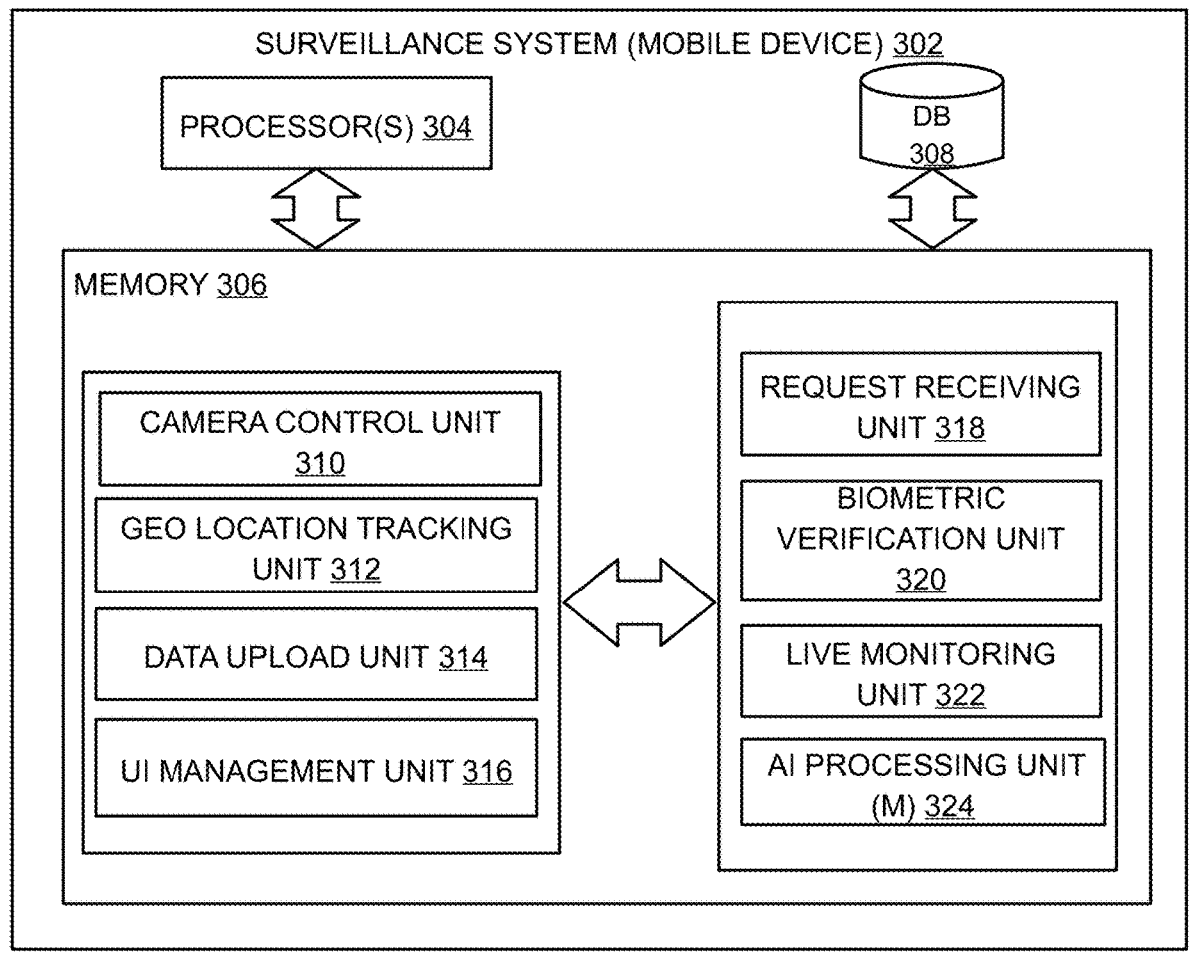
FIG. 3 is an exemplary depiction of a mobile device based surveillance system 300 for a mobile device with its core components according to the embodiments of the present invention.

FIG. 3 illustrates the architecture of the Surveillance System 300 utilized by mobile devices for property monitoring. This system includes various components and units that enable mobile devices to effectively capture, process, and transmit data for real-time surveillance and anomaly detection.

The Surveillance System 300 consists of the following main components:

Processor(s) 304 are the central processing units responsible for executing the mobile device's software instructions and managing its overall operations. These processors handle data processing, control various units within the system, and ensure the mobile device operates efficiently during monitoring tasks. Memory 306 stores the software instructions and data necessary for the mobile device's operation. It includes both volatile memory (RAM) for temporary data storage during processing and non-volatile memory (such as flash storage) for permanent data storage.

Database 308 stores all captured data, including photographic and video evidence, user logs, and processing results. This component is essential for maintaining historical records and enabling future reference and legal documentation. Camera Control Unit 310 manages the mobile device's cameras, ensuring the capture of high-resolution photographic and video evidence. This unit allows the mobile device to take time-stamped images and videos from various angles, providing comprehensive coverage of the property.

Geolocation Tracking Unit 312 provides real-time location data for the mobile device. This unit ensures that the mobile device's position is accurately tracked during monitoring tasks, allowing for precise navigation and data capture. Data Upload Unit 314 handles the transmission of captured data from the mobile device to the central processing server. This unit ensures that photographic and video evidence, along with any preliminary AI analysis results, are securely and efficiently transmitted for further processing and storage.

UI Management Unit 316 manages the user interface of the mobile device's surveillance application. This unit ensures that the interface is user-friendly and allows service providers to easily interact with the application, accept monitoring requests, and upload data. Request Receiving Unit 318 handles incoming monitoring requests from the central processing server. This unit ensures that service providers are promptly notified of new monitoring tasks and can respond quickly.

Biometric Verification Unit 320 ensures that only authorized users can operate the mobile device for surveillance tasks. This unit captures biometric data (such as fingerprints or facial recognition) and compares it with stored data to verify the identity of the service provider before allowing access to the monitoring application. Live Monitoring Unit 322 facilitates live streaming of the mobile device's surveillance activities. This unit allows property owners and operators to view real-time footage captured by the mobile device, providing immediate insights into the property's status and any detected anomalies.

AI Processing Unit 324 performs preliminary AI analysis of the captured images and videos. It uses advanced pattern recognition algorithms to identify potential anomalies or unauthorized occupancy, providing real-time processing capabilities at the mobile device level.

Overall, FIG. 3 provides a detailed view of the Surveillance System 300 utilized by mobile devices, highlighting the critical components and units that enable effective property monitoring. Each unit within the system plays a vital role in ensuring the mobile device captures high-quality data, processes it efficiently, and transmits it securely for comprehensive and real-time property surveillance. This robust and integrated system ensures that mobile devices can provide detailed and accurate monitoring of the property, enhancing the overall effectiveness of the property monitoring solution.

Components of the surveillance systems may be any combination of hardware and programming to implement the functionalities described herein. In some implementations, the programming may be processor executable instructions stored on a non-transitory machine-readable storage medium (e.g., memory), and the hardware may include at least one processing resource to retrieve and/or execute those instructions. Processor(s) may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) thus may also include the functionality to encode messages and/or data or information. Processor(s) may include, among other things, a clock, an arithmetic logic unit (ALU), and logic gates configured to support the operation of processor(s). Further, the processor(s) may include functionality to execute one or more software programs, which may be stored in the memory or otherwise accessible to processor(s).

Memory, may store any number of pieces of information, and data, used by the system to implement the functions of the system. The memory may include, for example, volatile memory and/or non-volatile memory. Examples of volatile memory may include but are not limited to volatile random-access memory (RAM). The non-volatile memory may additionally or alternatively comprise an electrically erasable programmable read-only memory (EEPROM), flash memory, hard drive, and the like. Some examples of volatile memory include, but are not limited to, dynamic RAM, static RAM, and the like. Some example of the non-volatile memory includes, but are not limited to, hard disks, magnetic tapes, optical disks, programmable read-only memory, erasable programmable read-only memory, electrically erasable programmable read-only memory, flash memory, and the like. Memory may be configured to store information, data, applications, instructions, or the like for enabling the system to carry out various functions in accordance with various example embodiments. Additionally, or alternatively, the memory may be configured to store instructions which when executed by processor(s) cause the surveillance management system to behave in a manner as described in various embodiments.

In one implementation, the network may be a wireless network, a wired network, or a combination thereof. Network may be implemented as one of the several types of networks, such as intranet, local area network (LAN), wide area network (WAN), the internet, and the like. Network may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network may include a variety of network devices, including routers, bridges, servers, computing devices, storage devices, and the like.

Figure 4:
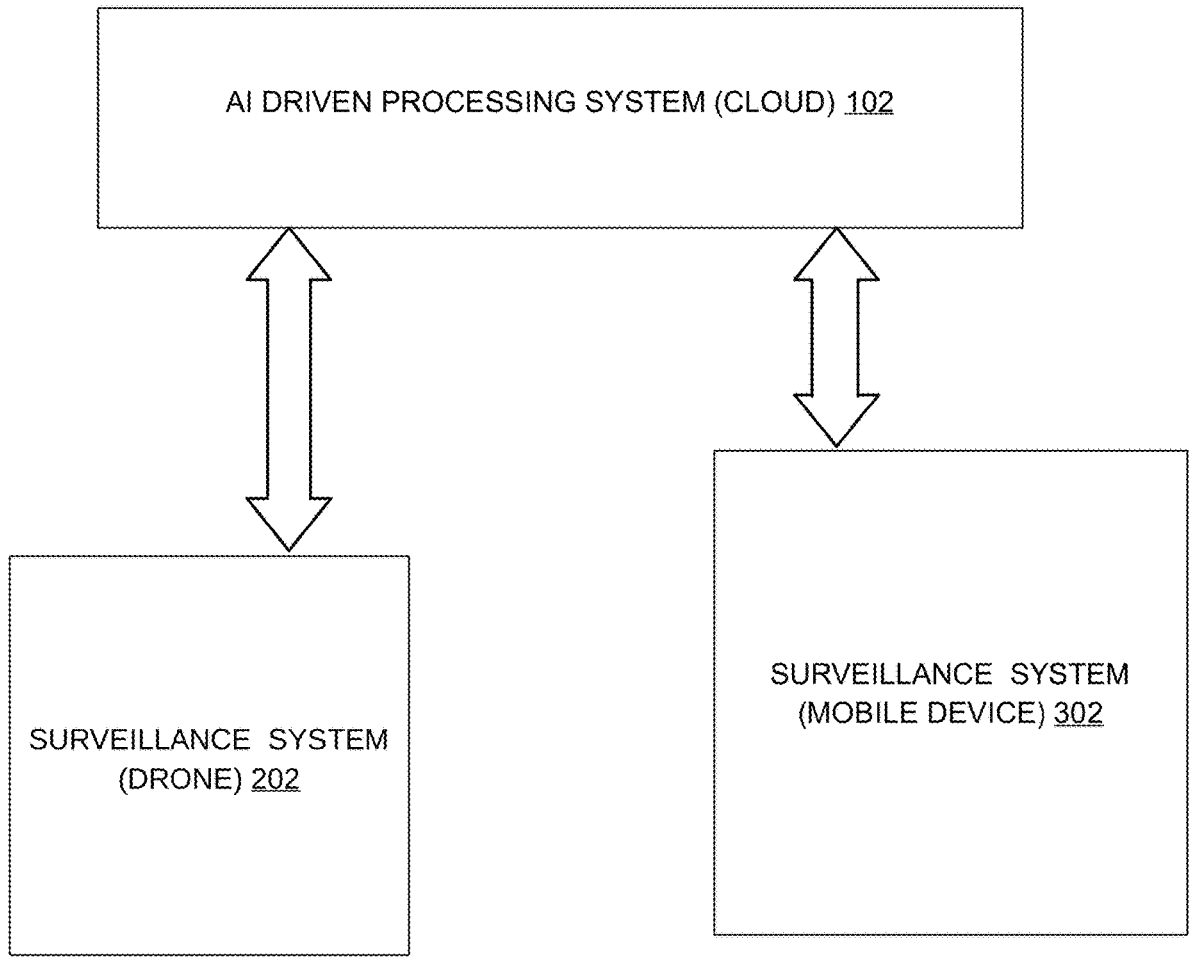
FIG. 4 provides an exemplary overview of the integration between the AI-driven processing system 102 and the surveillance systems of the drone 202 and the mobile device 302 according to the embodiments of the present invention.

FIG. 4 illustrates the integration and interaction between the AI-Driven Processing System 102 operating in the cloud and the Surveillance Systems of both the drone 202 and the mobile device 302. This figure highlights how these components work together to provide comprehensive property monitoring and management.

The AI-Driven Processing System 102, which can be hosted in the cloud or other environments, serves as the central hub for processing and analyzing data captured by the drones and mobile devices. The Surveillance System drone 202 captures high-resolution images and videos of the property from an aerial perspective. The drone's various units, including the Image Capture Unit, Navigation Control Unit, and AI Processing Unit, work together to ensure efficient data capture and preliminary processing. The captured data is then transmitted via the Data Transmission Unit to the AI-Driven Processing System 102.

Similarly, the Surveillance System mobile device 302 captures photographic and video evidence from ground-level perspectives. The mobile device's Camera Control Unit, Geolocation Tracking Unit, and AI Processing Unit handle the data capture and preliminary analysis. The captured data is transmitted to the AI-Driven Processing System 102 through the Data Upload Unit. The AI-Driven Processing System 102 processes the incoming data from both the drone and the mobile device, using its AI-Driven Processing Unit and Machine Learning Unit to detect anomalies and unauthorized activities. Alerts and detailed reports are generated and communicated to the property owner through the Alert and Communication Unit.

Figure 5:
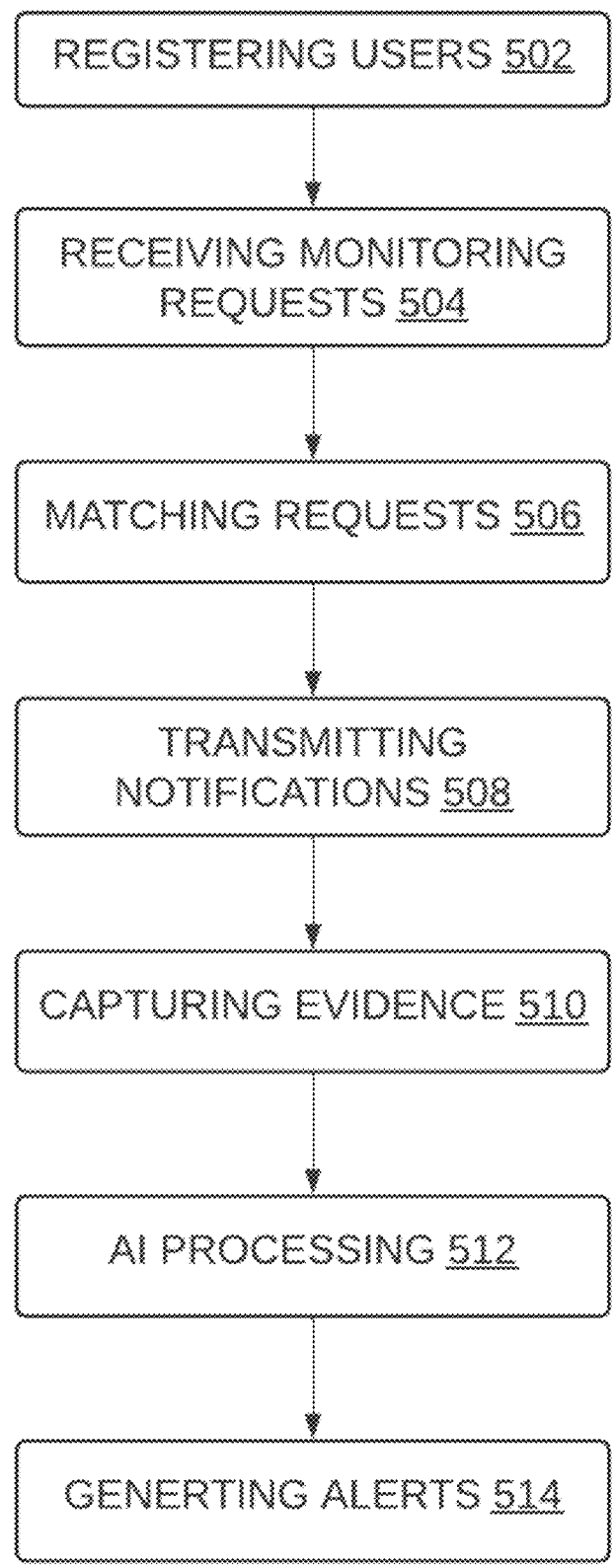
FIG. 5 is an exemplary depiction 500 of the interaction between different components of the property monitoring system according to the embodiments of the present invention.

FIG. 5 is a flowchart illustrating the sequence of operations within the property monitoring system, detailing the steps from user registration to alert generation. Each step in the process is crucial for ensuring comprehensive and efficient property surveillance.

Registering Users 502: This step involves the registration of users within the mobile application. Users include property owners and service providers (mobile users and drone operators). The User Management Unit 110 handles this process, ensuring that users are authenticated and their profiles are properly managed.

Receiving Monitoring Requests 504: Once users are registered, property owners can submit monitoring requests via the mobile application. These requests include details such as the property's geolocation and specific monitoring requirements. The Monitoring Request Unit handles the receipt and initial processing of these requests.

Matching Requests 506: After receiving the monitoring requests, the system matches these requests with available service providers based on geolocation data. The Matching Unit 112 ensures that the nearest and most suitable mobile user or drone is assigned to the task, optimizing efficiency and response times.

Transmitting Notifications 508: Once a match is found, the system transmits notifications to the selected service provider. This notification includes details of the monitoring task, such as the property location and specific instructions. The Notification Unit handles this communication, ensuring timely and accurate transmission of information.

Capturing Evidence 510: The assigned mobile user or drone proceeds to the property to capture photographic and video evidence. This step involves using the mobile device's Camera Control Unit 310 or the drone's Image Capture Unit 210 to gather high-resolution, time-stamped images and videos from various angles of the property.

AI Processing 512: The captured data is then processed using AI algorithms to detect any anomalies or unauthorized activities. The AI Processing Unit 116 performs this analysis, comparing the captured media against a database of known patterns and authorized activities to identify potential issues.

Generating Alerts 514: If the AI processing detects any anomalies or unauthorized activities, the system generates alerts. The Alert and Communication Unit 118 handles this step, creating alerts that include summaries of the findings and the relevant photographic and video evidence. These alerts are then sent to the property owner, ensuring they are promptly informed of any potential security breaches.

In summary, FIG. 5 provides a clear and detailed flow of operations within the property monitoring system, from registering users to generating alerts. Each step is integral to the system's ability to provide real-time, efficient, and effective property surveillance and anomaly detection.

Figure 6:
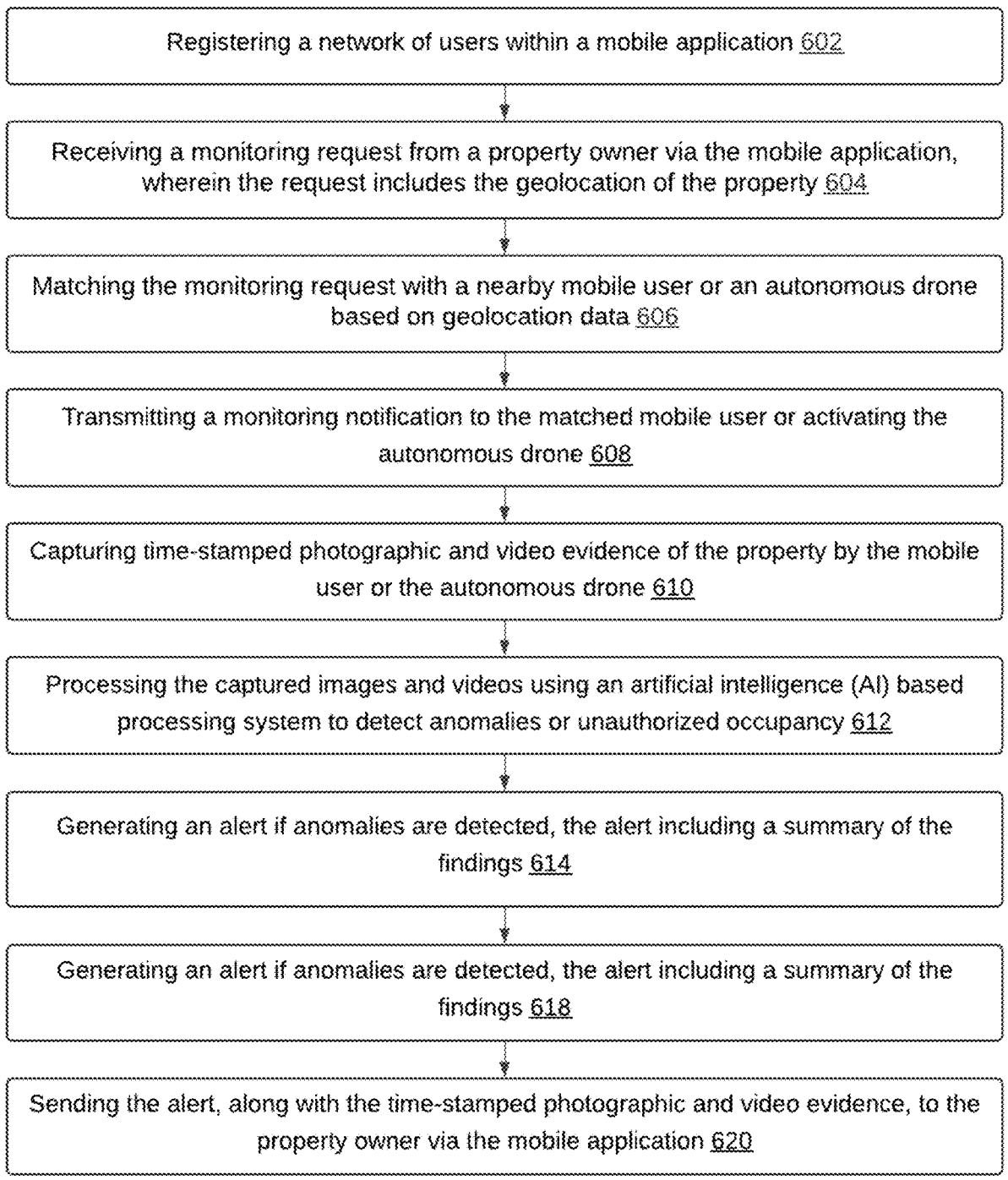
FIG. 6 is an exemplary depiction 600 of the method for performing home surveillance and monitoring using AI based systems, mobile devices and drones according to the embodiments of the present invention.

FIG. 6 is a flowchart detailing the steps involved in the property monitoring process, with each step annotated with a reference numeral. The process begins with registering a network of users within a mobile application 602. This step involves registering property owners and service providers (mobile users and drone operators) in the mobile application. The User Management Unit 110 handles user registration and authentication.

Next, the system involves receiving a monitoring request from a property owner via the mobile application, wherein the request includes the geolocation of the property 604. Property owners submit monitoring requests through the mobile application, specifying the property's geolocation and other relevant details. This step is managed by the Monitoring Request Unit.

The system then proceeds to matching the monitoring request with a nearby mobile user or an autonomous drone based on geolocation data 606. The system matches the monitoring request with the nearest available mobile user or drone using geolocation data. The Matching Unit 112 performs this function.

Following this, the system transmits a monitoring notification to the matched mobile user or activates the autonomous drone 608. Once a match is found, the system transmits a notification to the selected service provider, either a mobile user or an autonomous drone, informing them of the monitoring task. This task is handled by the Notification Unit.

The assigned mobile user or drone then captures time-stamped photographic and video evidence of the property by the mobile user or the autonomous drone 610. The Camera Control Unit 310 in mobile devices and the Image Capture Unit 210 in drones manage this step, ensuring the capture of high-resolution, time-stamped photographic and video evidence of the property.

The captured images and videos are then processed using an artificial intelligence (AI) based processing system to detect anomalies or unauthorized occupancy 612. This analysis is performed by the AI-Driven Processing Unit 116, which uses AI to detect any anomalies or unauthorized activities. If anomalies are detected, the system generates an alert if anomalies are detected, the alert including a summary of the findings 614. The Alert and Communication Unit 118 handles this step, generating an alert that includes a summary of the findings. To ensure redundancy in communication for critical alerts, the system again generates an alert if anomalies are detected, the alert including a summary of the findings 618.

Finally, the alert, along with the time-stamped photographic and video evidence, is sent to the property owner via the mobile application 620. The Alert and Communication Unit 118 ensures timely and accurate delivery of this information, keeping the property owner informed of any potential security breaches.

In summary, FIG. 6 provides a detailed flow of operations within the property monitoring system, illustrating how user registration, monitoring requests, evidence capture, AI processing, and alert generation are systematically managed to ensure effective property surveillance.

Figure 7:
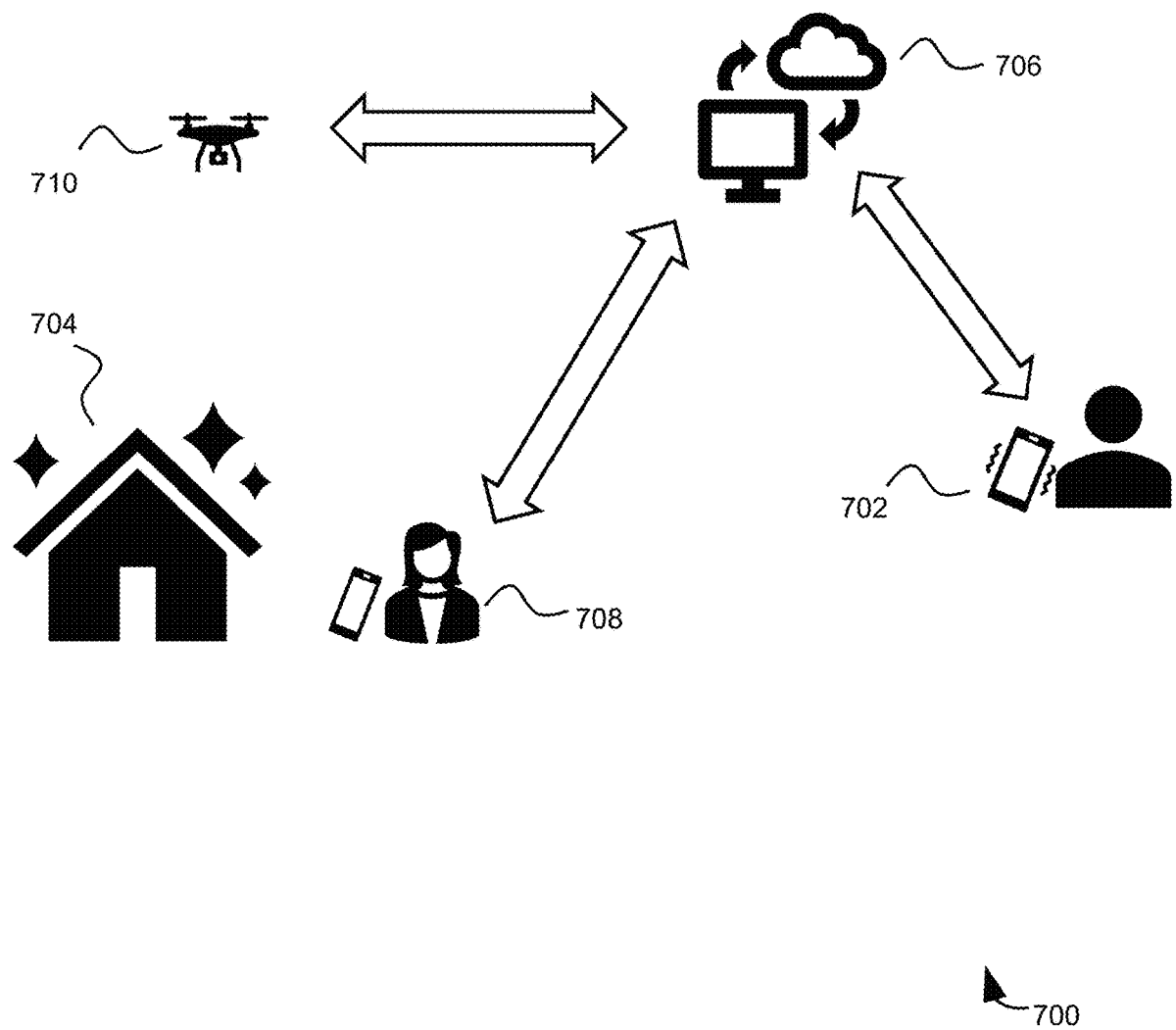
FIG. 7 is an exemplary overview of the interactions and components involved in the property monitoring system according to the embodiments of the present invention.

FIG. 7 illustrates the interactions and components involved in the property monitoring system, highlighting the roles of various elements in the process. 702 represents the user who initiates home monitoring via the user's mobile device. This user is responsible for setting up and managing the monitoring of their property. Using their mobile device, the user can register the property, submit monitoring requests, and receive alerts and updates about the property's status. 704 represents the home that is to be monitored. This is the property that the system will surveil using mobile devices and drones.

The home is the focal point of the monitoring efforts, where all captured data, such as images and videos, will be centered. 706 is the AI-based processing system for surveillance and monitoring, working from the cloud in this example. This system handles the processing and analysis of the data captured by mobile devices and drones. The AI-driven system analyzes the images and videos to detect anomalies or unauthorized activities and generates alerts based on its findings.

Being cloud-based allows it to leverage scalable computational resources and provide real-time processing and analysis. 708 is the user with a mobile device who is monitoring the house via the mobile application. This user receives real-time updates, alerts, and data from the AI-based processing system. The mobile application enables the user to view live streams, access recorded footage, and interact with the monitoring system to ensure the property's security. 710 is the drone. The drone is an essential component of the monitoring system, capable of capturing high-resolution images and videos from an aerial perspective. The drone operates autonomously, following pre-programmed flight paths and transmitting captured data back to the AI-based processing system in the cloud for analysis.

In summary, FIG. 7 depicts a comprehensive property monitoring system where a user initiates and manages monitoring via a mobile device, a home is surveilled by both mobile devices and drones, data is processed by an AI-based system in the cloud, and another user monitors the property using a mobile application. This setup ensures efficient, real-time property monitoring and security management.

The integration of drones into this property monitoring system offers several significant advantages. Firstly, drones provide unparalleled access to difficult or hazardous areas that are otherwise challenging to monitor. Their aerial capabilities allow them to cover large areas quickly and efficiently, capturing comprehensive data from multiple angles. This is particularly beneficial for extensive properties, remote locations, or areas with difficult terrain. The ability to fly over obstacles and reach high or confined spaces ensures thorough surveillance, which is crucial for identifying potential security breaches or environmental changes.

Secondly, drones equipped with high-resolution cameras and advanced imaging technologies can capture detailed photographic and video evidence. This high-quality data is invaluable for accurate analysis and reporting. The AI processing unit within the system can analyze these detailed images to detect anomalies, unauthorized activities, or environmental changes with greater precision. Furthermore, drones can be equipped with various sensors to collect additional data, such as thermal imaging for detecting heat sources or infrared sensors for night surveillance. This versatility in data collection enhances the overall effectiveness of the monitoring system, providing property owners with a more robust and reliable security solution.

Lastly, the use of drones in property monitoring significantly enhances the efficiency and responsiveness of the system. Drones can be deployed quickly in response to monitoring requests, reducing the time lag between request and action. This rapid deployment capability is particularly useful in emergency situations, such as natural disasters or security breaches, where timely information is critical. Additionally, drones can operate autonomously, following pre-programmed flight paths and performing regular surveillance without constant human intervention. This automation not only reduces labor costs but also ensures continuous and consistent monitoring. By integrating drones into the property monitoring system, the invention leverages advanced technology to provide a more efficient, effective, and comprehensive security solution.

The system can be utilized for various applications such as environmental monitoring, where drones capture data on wildlife and vegetation health, aiding conservation efforts through AI analysis. It supports disaster response by assessing damage and locating survivors post-disasters. In urban planning, the system provides aerial surveys of construction sites to monitor progress and compliance. Wildlife conservation benefits from monitoring animal movements and habitat conditions, with AI supporting conservation strategies. Additionally, the system is effective for oil and gas pipeline monitoring, detecting leaks and corrosion to ensure infrastructure integrity and reduce environmental risks. In agriculture, it monitors crop health and soil conditions, enabling timely interventions to optimize yields. For infrastructure projects like bridges and highways, it ensures safety by detecting structural issues early, supporting proactive maintenance and repair efforts.

To enhance the system's capability in emergency situations, an automated emergency response feature is integrated. This feature enables the system to automatically contact local authorities or trigger other emergency protocols in case of a detected emergency. For instance, if the AI-based processing system detects signs of a break-in, fire, or other critical anomalies, the system can immediately alert the nearest police station, fire department, or other relevant emergency services. This automated response ensures that help is dispatched promptly, potentially mitigating damage or preventing further unauthorized activities. The communication unit within the system handles the automated dispatch of alerts to emergency services, ensuring that critical information, including the nature of the emergency and the property's location, is transmitted accurately and swiftly.

To cater to a diverse user base, the system includes multi-lingual support for alerts and reports. This feature ensures that users from different linguistic backgrounds can utilize the system effectively. The mobile application and AI processing system are designed to generate alerts and detailed reports in multiple languages, based on the user's preferences. This multi-lingual support is critical in providing a user-friendly experience, allowing property owners worldwide to receive and understand important notifications about their property's status without language barriers. The user interface unit within the mobile application allows users to select their preferred language, ensuring that all communications, including real-time alerts, reports, and system messages, are delivered in the chosen language.

To further enhance the system's coverage and efficiency, the invention incorporates drone swarm technology. This feature allows for the coordinated operation of multiple drones, working together to monitor large properties or extensive areas. The drone swarm technology is particularly useful in applications such as agriculture, where vast fields need to be monitored, or disaster response, where large areas need to be surveyed quickly for damage assessment and survivor location. Each drone within the swarm communicates with the central AI processing system and with each other, ensuring optimal coverage and efficient data collection. The navigation control unit within each drone is designed to coordinate flight paths and avoid collisions, enabling a seamless and efficient operation of the drone fleet. This collaborative approach significantly enhances the system's ability to provide comprehensive surveillance over large and complex environments.

Examples described herein can also be used in various other scenarios and for various purposes. It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The present description has been shown and described with reference to the foregoing examples. It is understood, however, that other forms, details, and examples can be made without departing from the spirit and scope of the present subject matter.

What is claimed is:

1. A method for remote property monitoring, comprising:
   registering a network of users within a mobile application;
   receiving a monitoring request from a property owner via the mobile application, wherein the request includes the geolocation of the property;
   matching the monitoring request with a nearby mobile user or an autonomous drone based on geolocation data;
   transmitting a monitoring notification to the matched mobile user or activating the autonomous drone;
   capturing time-stamped photographic and video evidence of the property by the mobile user or the autonomous drone;
   processing the captured images and videos using an artificial intelligence (AI) based processing system to detect anomalies or unauthorized occupancy;
   generating an alert if anomalies are detected, the alert including a summary of the findings; and sending the alert, along with the time-stamped photographic and video evidence, to the property owner via the mobile application.

2. The method of claim 1, wherein the mobile application further comprises:
   a user interface for scheduling the frequency and type of property monitoring;
   a payment processing module for compensating the mobile user or drone operator; and
   a rating system for evaluating the performance of the mobile user or drone operator.

3. The method of claim 1, wherein the AI based processing system for detecting anomalies includes pattern recognition to compare captured images and videos against a database of known patterns and authorized activities.

4. The method of claim 1, further comprising the step of storing the captured photographic and video evidence in a central processing server and database for future reference and legal purposes.

5. The method of claim 1, further comprising the step of verifying the identity of the mobile user or drone operator through biometric data before authorizing them to perform property monitoring.

6. The method of claim 1, wherein the captured images and videos are processed to remove any irrelevant data, focusing only on areas of interest identified by the property owner.

7. The method of claim 1, wherein the mobile application further comprises a feature for property owners to set specific zones within the property for focused monitoring.

8. The method of claim 1, further comprising the step of generating a detailed report that includes the AI analysis, time-stamped images, videos, a log of all activities detected during the monitoring session, and includes multi-lingual support.

9. The method of claim 1, wherein the AI based processing system is continuously updated with new patterns and behaviors to improve anomaly detection accuracy over time, and supports automated emergency response by contacting local authorities or triggering emergency protocols.

10. The method of claim 1, further comprising a step for the mobile application to integrate with third-party home security systems to provide a comprehensive security solution, and utilizes drone swarm technology for coordinated operation of multiple drones.

11. A system for remote property monitoring, comprising:
   a mobile application configured to register a network of users, receive monitoring requests from property owners, and include the geolocation of the property in the requests;
   a central processing server configured to:
      match monitoring requests with nearby mobile users or autonomous drones based on geolocation data;
      transmit monitoring notifications to the matched mobile users or activate the autonomous drones; and
      process captured images and videos using an AI-based processing system to detect anomalies or unauthorized occupancy;
   a database for storing time-stamped photographic and video evidence captured by the mobile users or autonomous drones, and generating alerts with summaries of the findings; and
   a communication unit for sending the alerts, along with the time-stamped photographic and video evidence, to the property owners via the mobile application.

12. The system of claim 11, wherein the mobile application further comprises:
   a user interface for scheduling the frequency and type of property monitoring;
   a payment processing unit for compensating the mobile users or drone operators; and
   a rating system for evaluating the performance of the mobile users or drone operators.

13. The system of claim 11, wherein the AI-based processing system for detecting anomalies includes pattern recognition to compare captured images and videos against a database of known patterns and authorized activities.

14. The system of claim 11, further comprising a central processing server and database for storing the captured photographic and video evidence for future reference and legal purposes.

15. The system of claim 11, further comprising a biometric verification unit for verifying the identity of mobile users or drone operators before authorizing them to perform property monitoring.

16. The system of claim 11, wherein the captured images and videos are processed to remove any irrelevant data, focusing only on areas of interest identified by the property owner.

17. The system of claim 11, wherein the mobile application includes a feature for property owners to set specific zones within the property for focused monitoring.

18. The system of claim 11, further comprising a reporting unit configured to generate detailed reports that include AI analysis, time-stamped images, videos, and a log of all activities detected during the monitoring session, and includes multi-lingual support.

19. The system of claim 11, wherein the AI-based processing system is continuously updated with new patterns and behaviours to improve anomaly detection accuracy over time, and supports automated emergency response by contacting local authorities or triggering emergency protocols.

20. The system of claim 11, further comprising an integration unit for the mobile application to connect with third-party home security systems to provide a comprehensive security solution, and utilizes drone swarm technology for coordinated operation of multiple drones.

* * * * *